United States Patent
Harper

(10) Patent No.: US 10,288,213 B1
(45) Date of Patent: May 14, 2019

(54) LOAD DOCK LEVELER PROP

(71) Applicant: Barry Harper, Ripon, CA (US)

(72) Inventor: Barry Harper, Ripon, CA (US)

( * ) Notice: Subject to any disclaimer, the term of this patent is extended or adjusted under 35 U.S.C. 154(b) by 0 days.

(21) Appl. No.: 16/031,268

(22) Filed: Jul. 10, 2018

(51) Int. Cl.
*F16M 11/04* (2006.01)
*B65G 69/28* (2006.01)

(52) U.S. Cl.
CPC ....... *F16M 11/046* (2013.01); *B65G 69/2811* (2013.01)

(58) Field of Classification Search
CPC .......................... F16M 11/046; B65G 69/2811
USPC ....... 248/125.2, 125.8, 411, 161, 354.5, 662, 248/352; 14/71.1, 71.3
See application file for complete search history.

(56) References Cited

U.S. PATENT DOCUMENTS

| 1,061,658 | A | * | 5/1913 | Bradshaw | B66F 3/08 248/354.3 |
| D230,014 | S | | 1/1974 | Edgell, Sr. | |
| 4,245,808 | A | * | 1/1981 | John | B66F 3/08 248/165 |
| 5,440,772 | A | | 8/1995 | Springer | |
| 5,586,355 | A | | 12/1996 | Metz | |
| 5,862,635 | A | * | 1/1999 | Linse | E04H 9/14 52/126.6 |
| 6,035,475 | A | | 3/2000 | Alexander | |
| 6,256,939 | B1 | * | 7/2001 | Snyder | E04D 11/007 52/126.6 |
| 6,276,016 | B1 | | 8/2001 | Springer | |
| 6,336,620 | B1 | * | 1/2002 | Belli | E04F 11/1812 248/346.01 |
| 6,405,981 | B1 | * | 6/2002 | Hung-Jang | F16C 13/00 242/599.3 |
| 7,134,159 | B2 | | 11/2006 | Muhl | |
| 9,284,135 | B2 | | 3/2016 | Sveum | |
| 2006/0042030 | A1 | | 3/2006 | Yoon | |

FOREIGN PATENT DOCUMENTS

CA 2919890 2/2015

* cited by examiner

*Primary Examiner* — Muhammad Ijaz
(74) *Attorney, Agent, or Firm* — Kyle A. Fletcher, Esq.

(57) ABSTRACT

The load dock leveler prop is configured for use with a loading dock. The loading dock is further defined with a dock plate. The load dock leveler prop is a prop used to prop the dock plate when the dock plate is bridging a gap between the loading dock and a trailer. The load dock leveler prop is a vertically adjustable jack structure. The load dock leveler prop comprises a dock head, a stanchion and a pedestal. The dock head mechanically supports the inferior side of the dock plate by forming a load path between the dock plate and the stanchion. The stanchion is a supporting shaft that forms a load path between the dock head and the pedestal. The cant between the dock head and the stanchion is adjustable. The pedestal is a foundational structure that forms a load path between the stanchion and a supporting surface.

16 Claims, 4 Drawing Sheets

LOAD DOCK LEVELER PROP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including the auxiliary devices used for loading and unloading material, more specifically, a safety leg used as a constructional feature of a loading dock.

Summary of Invention

The load dock leveler prop is configured for use with a loading dock. The loading dock is further defined with a dock plate. The load dock leveler prop is a prop used to prop the dock plate when the dock plate is bridging a gap between the loading dock and a trailer. The load dock leveler prop is a vertically adjustable jack structure. The load dock leveler prop comprises a dock head, a stanchion, and a pedestal. The dock head mechanically supports the inferior side of the dock plate by forming a load path between the dock plate and the stanchion. The stanchion is a supporting shaft that forms a load path between the dock head and the pedestal. The cant between the dock head and the stanchion is adjustable. The pedestal is a foundational structure that forms a load path between the stanchion and a supporting surface.

These together with additional objects, features and advantages of the load dock leveler prop will be readily apparent to those of ordinary skill in the art upon reading the following detailed description of the presently preferred, but nonetheless illustrative, embodiments when taken in conjunction with the accompanying drawings.

In this respect, before explaining the current embodiments of the load dock leveler prop in detail, it is to be understood that the load dock leveler prop is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the load dock leveler prop.

It is therefore important that the claims be regarded as including such equivalent construction insofar as they do not depart from the spirit and scope of the load dock leveler prop. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
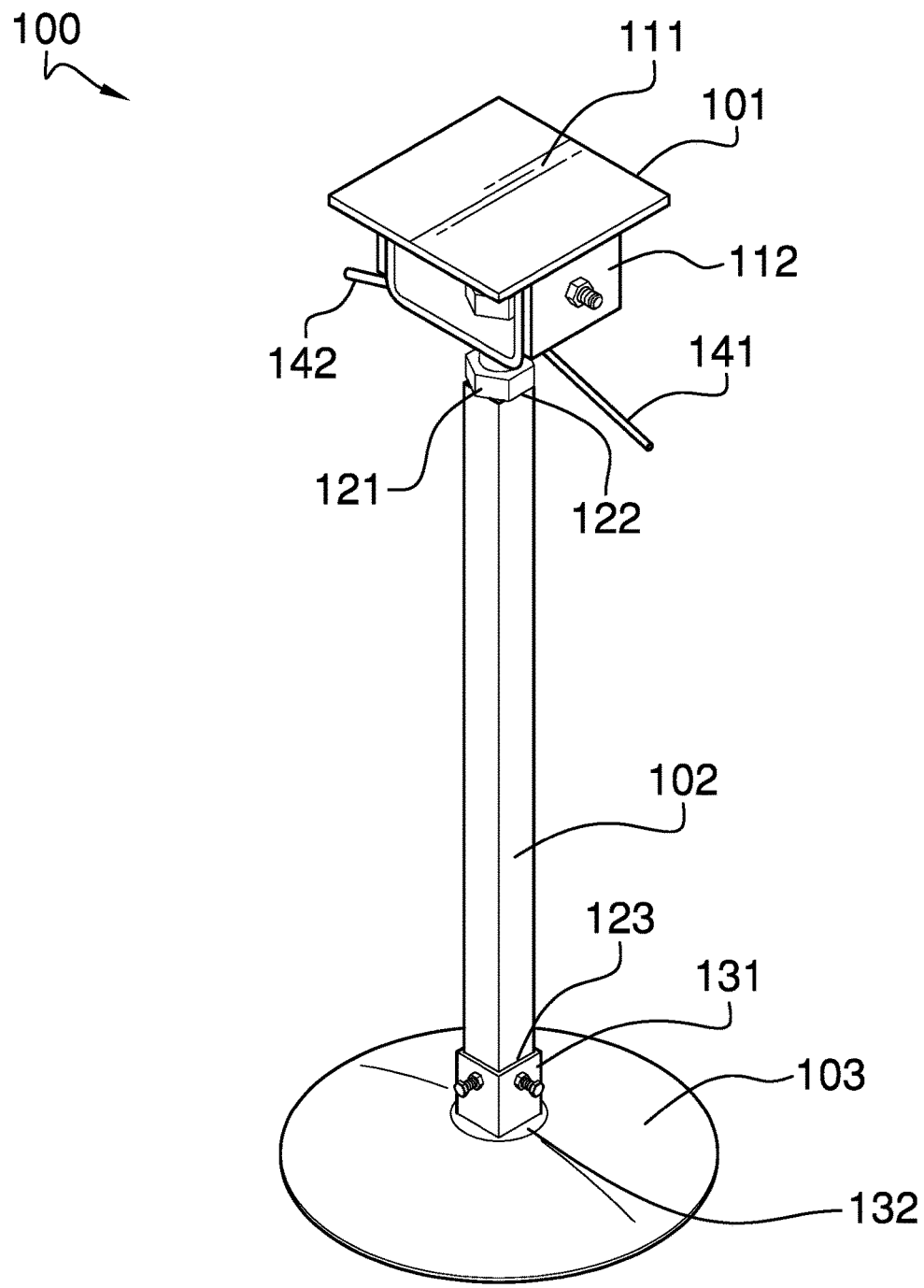
FIG. 1 is a perspective view of an embodiment of the disclosure.
Figure 2:
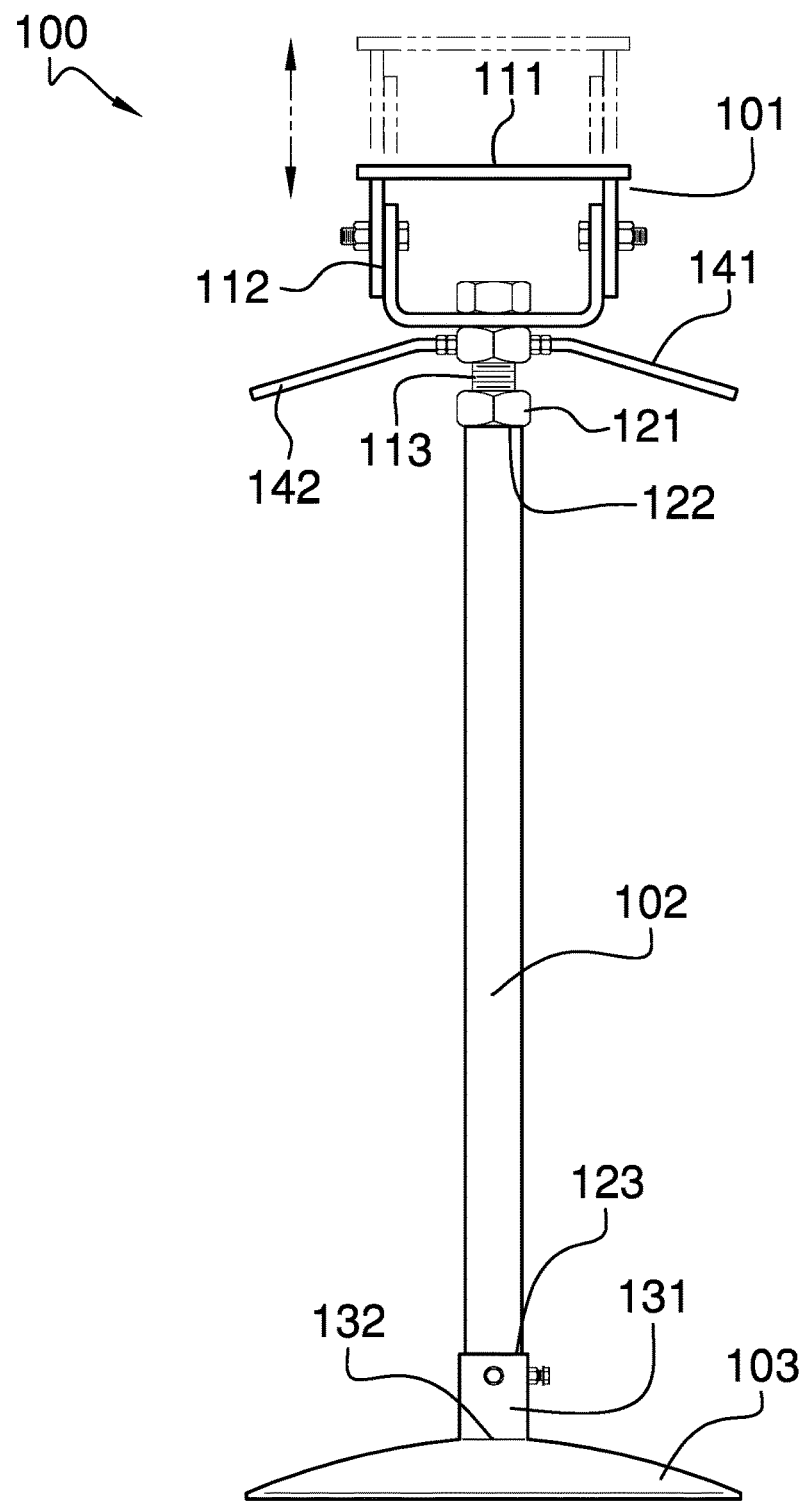
FIG. 2 is a front view of an embodiment of the disclosure.
Figure 3:
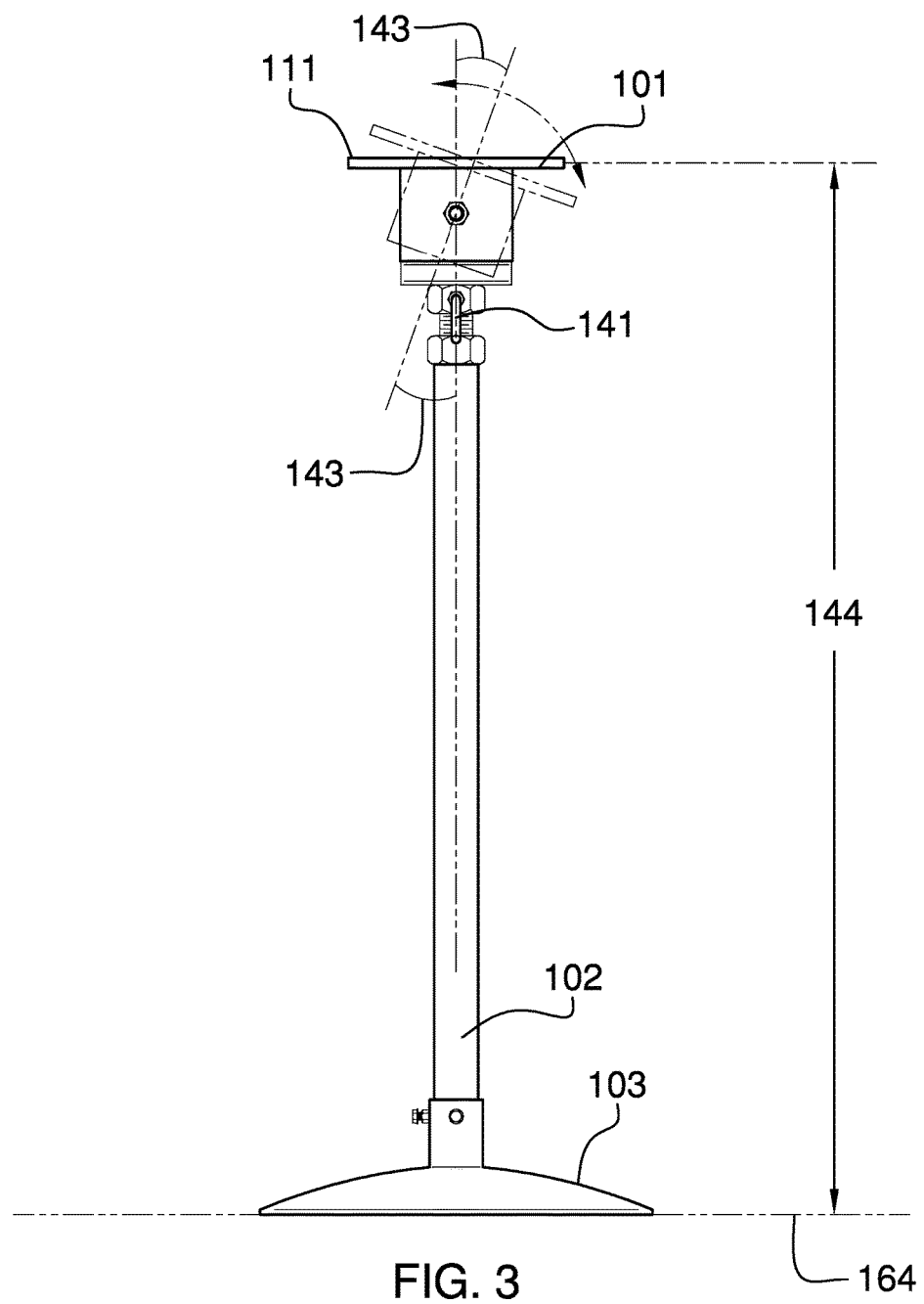
FIG. 3 is a side view of an embodiment of the disclosure.
Figure 4:
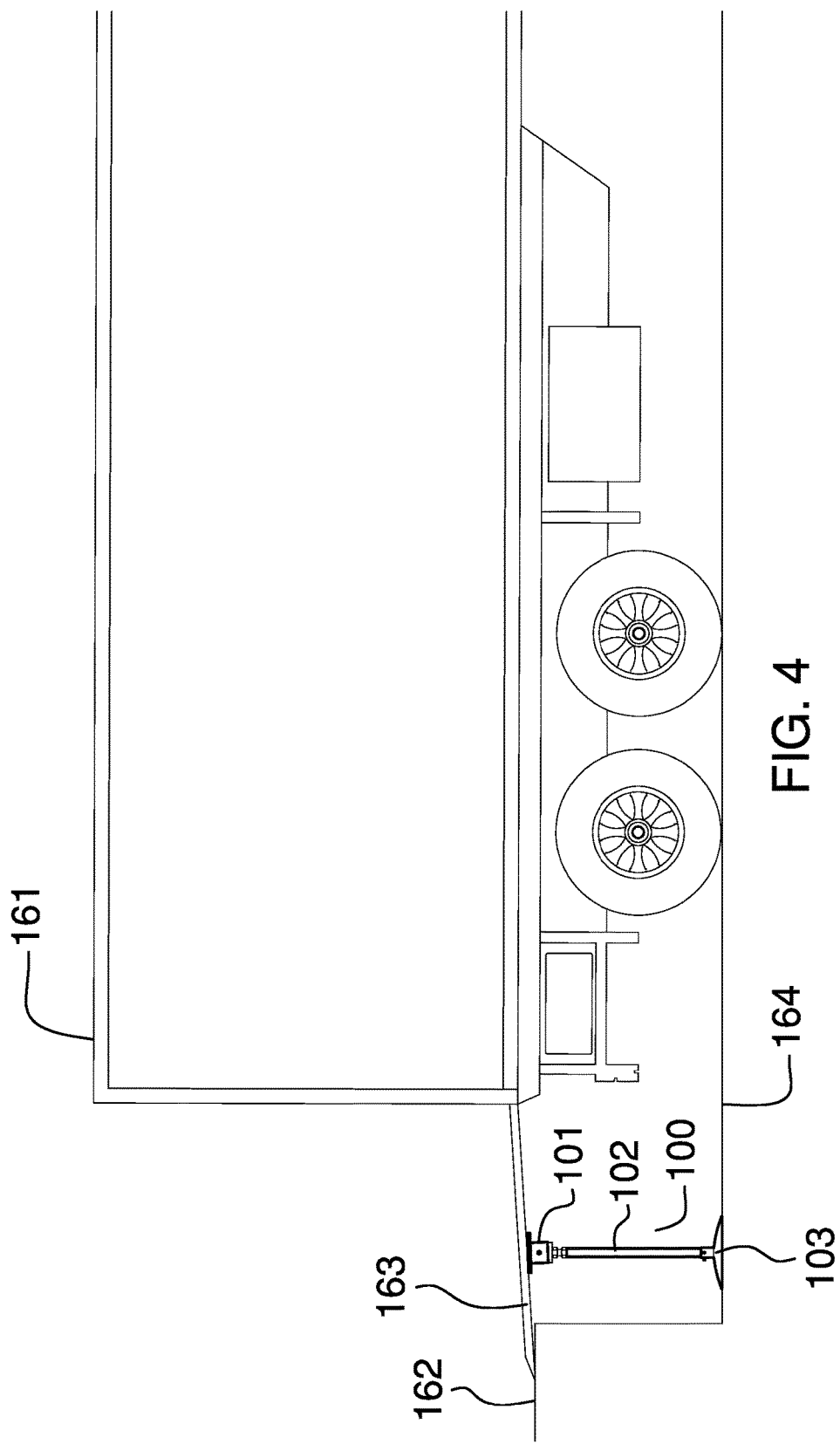
FIG. 4 is an in-use view of an embodiment of the disclosure.

Detailed reference will now be made to one or more potential embodiments of the disclosure, which are illustrated in FIGS. 1 through 4.

The load dock leveler prop 100 (hereinafter invention) is configured for use with a loading dock 162. The loading dock 162 is further defined with a dock plate 163. The invention 100 is a prop used to prop the dock plate 163 when the dock plate 163 is bridging a gap between the loading dock 162 and a trailer 161. The invention 100 is a vertically adjustable jack structure. The invention 100 comprises a dock head 101, a stanchion 102 and a pedestal 103. The dock head 101 mechanically supports the inferior side of the dock plate 163 by forming a load path between the dock plate 163 and the stanchion 102. The stanchion 102 is a supporting shaft that forms a load path between the dock head 101 and the pedestal 103. The cant 143 between the dock head 101 and the stanchion 102 is adjustable. The pedestal 103 is a foundational structure that forms a load path between the stanchion 102 and a supporting surface 164.

The trailer 161 is defined in greater detail elsewhere in this disclosure. The loading dock 162 is defined in greater detail elsewhere in this disclosure. The dock plate 163 is defined in greater detail elsewhere in this disclosure. The supporting surface 164 is defined in greater detail elsewhere in this disclosure. This disclosure assumes that the supporting surface 164 is the ground.

The dock head 101 is the superior component of the invention 100. The dock head 101 transfers the load carried by the dock plate 163 to the stanchion 102. The dock head 101 comprises a prop plate 111, a universal joint 112, and a bolt 113. The prop plate 111 is further defined with an elevation 144. The dock head 101 is further defined with a cant 143.

The elevation 144 is the span of the vertical distance between the center of the prop plate 111 and the supporting surface 164.

The cant 143 of dock head 101 is adjustable such that the contact area between the dock head 101 and the dock plate 163 can be adjusted to accommodate variations in: a) the height of the trailer 161; b) the height of the loading dock 162; and, c) the angle between the supporting surface 164 and the dock plate 163 when the dock plate 163 forms a bridge between the trailer 161 and the loading dock 162. By cant 143 is meant the acute angle formed between the center axis of the stanchion 102 and a hypothetical line drawn through the center of the prop plate 111 that is perpendicular to the faces of the prop plate 111.

The prop plate 111 is a commercially available metal plate structure. The prop plate 111 attaches to the universal joint 112 such that the prop plate 111 forms the superior component of the dock head 101. The prop plate 111 physically contacts the dock plate 163 such that the prop plate 111 transfers the load from the dock plate 163 to the universal joint 112.

The universal joint 112 is a commercially available universal joint. The universal joint 112 is a locking structure. The universal joint 112 adjusts and fixes the cant 143 of the dock head 101 relative to the center axis of the stanchion 102. The universal joint 112 further comprises a first handle 141 and a second handle 142. The first handle 141 is a grip that is used to lock, unlock, and adjust the cant 143 of the universal joint 112. The second handle 142 is a grip that is used to lock, unlock, and adjust the cant 143 of the universal joint 112. The first handle 141 and the second handle 142 are provisioned with the universal joint 112.

The bolt 113 is a cylindrical structure that is formed with an exterior screw thread. The bolt 113 screws into the stanchion 102 to attach the dock head 101 to the stanchion 102. The bolt 113 screws into the stanchion 102 to form a threaded connection. The elevation 144 of the prop plate 111 adjusts by adjusting the depth that the bolt 113 screws into the stanchion 102.

The stanchion 102 is a hollow prism-shaped tubular structure. The stanchion 102 forms a load bearing vertical shaft. The stanchion 102 is a metal structure that forms a load path that transfers the load from the dock head 101 to the pedestal 103. The stanchion 102 is further defined with a superior end 122 and an inferior end 123. The superior end 122 is the end of the stanchion 102 that is distal from the supporting surface 164 when the invention 100 is used normally. The inferior end 123 is the end of the stanchion 102 that is distal from the superior end 122.

The stanchion 102 further comprises a head nut 121. The head nut 121 is a disk-shaped ring that is further formed with an interior screw thread. The head nut 121 is sized to receive the bolt 113 to form the threaded connection that attaches the dock head 101 to the stanchion 102. The head nut 121 mounts on the superior end 122 of the stanchion 102 such that the center axis of the head nut 121 aligns with the center axis of the stanchion 102. The head nut 121 encloses an open end of the stanchion 102 such that the bolt 113 will move into the interior of the stanchion 102 when the bolt 113 screws into the head nut 121.

The pedestal 103 is the inferior element of the invention 100. The pedestal 103 transfers the load carried by the stanchion 102 to the supporting surface 164. The pedestal 103 is formed in the shape of a right quadric section. The bifurcating plane of the pedestal 103 sits on the supporting surface 164 when the invention 100 is in use. The intersection of the pedestal 103 and the bifurcating plane forms a circular perimeter. The pedestal 103 sits on the supporting surface 164 such that the major axis of the pedestal 103 projects perpendicularly away from the supporting surface 164. The pedestal 103 further comprises an inferior flange 131. The pedestal 103 is further defined with an apex 132.

The inferior flange 131 is a flange that attaches the inferior end 123 of the stanchion 102 to the pedestal 103. The inferior flange 131 is geometrically similar to the stanchion 102. The inner diameter of the inferior flange 131 is greater than the outer diameter of the stanchion 102 such that the inferior end 123 of the stanchion 102 inserts into the inferior flange 131. The inferior flange 131 mounts at the apex of the pedestal 103.

The apex 132 refers to the point where the major axis of the quadric section that forms the pedestal 103 intersects with the exterior surface of the pedestal 103.

The following three paragraphs describe the assembly of the invention 100.

The inferior flange 131 attaches to the apex 132 of the pedestal 103 such that the center axis of the inferior flange 131 aligns with the major axis of the pedestal 103. The inferior end 123 of the stanchion 102 inserts into the inferior flange 131 of the pedestal 103. The inferior end 123 of the stanchion 102 attaches to the inferior flange 131 using hardware.

The head nut 121 attaches to the superior end 122 of the stanchion 102 such that the center axis of the stanchion 102 aligns with the center axis of the head nut 121. The bolt 113 attaches the universal joint 112 to the head nut 121. The bolt 113 screws into the head nut 121 such that the center axis of the bolt 113 and the center axis of the head nut 121 align. The elevation 144 of the prop plate 111 adjusts by adjusting the depth that the bolt 113 screws into the head nut 121 and the stanchion 102.

The universal joint 112 attaches the prop plate 111 to the bolt 113. The cant 143 of the prop plate 111 adjusts by adjusting the orientation of the universal joint 112 relative to the center axis of the stanchion 102 using the first handle 141 and the second handle 142. The invention 100 is placed underneath the dock plate 163 and adjusted such that the prop plate 111 sits flush against the inferior surface of the dock plate 163.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Apex: As used in this disclosure, an apex is the point of an object that has the greatest height or altitude relative to a given reference.

Bolt: As used in this disclosure, a bolt is a cylindrical shaft formed with an exterior screw thread. A bolt is defined with an outer diameter.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Collar: As used in this disclosure, a collar is a ring-like device that is placed around an object.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance.

Dock: As used in this disclosure, a dock refers to a platform used for transferring loads into and out of a vehicle or vessel. A dock will typically, but not necessarily, have facilities for accommodating horizontal and vertical misalignments between the vehicle and the platform.

Dock Plate: As used in this disclosure, a dock plate refers to a metal plate configured for use with a dock. The dock plate forms a surface used to bridge horizontal and vertical misalignments between a vehicle and the platform of the dock.

Elevation: As used in this disclosure, elevation refers to the span of the distance between a horizontal surface and a supporting surface as measured in the direction opposite to the force of gravity.

Exterior Screw Thread: An exterior screw thread is a ridge wrapped around the outer surface of a tube in the form of a helical structure that is used to convert rotational movement into linear movement.

Flange: As used in this disclosure, a flange is a protruding rib, edge, or collar that is used to hold an object in place or to attach a first object to a second object. A flange has a tubular structure.

Flush: As used in this disclosure, the term flush is used to describe the alignment of a first surface and a second surface on a single plane.

Force of Gravity: As used in this disclosure, the force of gravity refers to a vector that indicates the direction of the pull of gravity on an object at or near the surface of the earth.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Grip: As used in this disclosure, a grip is an accommodation formed on or within an object that allows the object to be grasped or manipulated by a hand.

Ground: As used in this disclosure, the ground is a solid supporting surface formed by the Earth. The term level ground means that the supporting surface formed by the ground is roughly perpendicular to the force of gravity.

Handle: As used in this disclosure, a handle is an object by which a tool, object, or door is held or manipulated with the hand.

Hardware: As used in this disclosure, refers to a one or more incidental objects: 1) that are readily and commercially available; and, 2) that are associated with the installation, operation or maintenance of a primary object. Always use incidental.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior Screw Thread: An interior screw thread is a groove that is formed around the inner surface of a tube in the form of a helical structure that is used to convert rotational movement into linear movement.

Jack: As used in this disclosure, a jack is a mechanical device for lifting heavy loads using a force applied with a lever, screw, or hydraulic press.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to an edge of a rectangular or rectilinear structure.

N-gon: As used in this disclosure, an N-gon is a regular polygon with N sides wherein N is a positive integer number greater than 2.

Nut: As used in this disclosure, a nut is a first object formed with a cylindrical negative space that further comprises an interior screw thread such that a bolt with a matching exterior screw thread can screw into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pedestal: As used in this disclosure, a pedestal is an intermediary load bearing structure that that transfers a load path between a supporting surface and an object, structure, or load.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular or disk like appearance. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder. See Truss Prop: As used in this disclosure, a prop refers to a structure that supports a raised horizontal surface from the inferior side. By support is meant that the prop bears a portion of the load path of the raised horizontal surface.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Quadric Section: As used in this disclosure, a quadric section refers either one of the two objects formed by the bifurcation of a quadric by a bifurcating plane that passes through the center axis of the structure contained by quadric surface. A right quadric section occurs when the bifurcating plane intersects the center axis of the quadric surface. A quadric semi-section occurs when the bifurcating plane contains the center axis of the quadric surface. The angle of the quadric section is the angle formed between the bifurcating plane and the center axis of the quadric surface.

Quadric Surface: As used in this disclosure, a quadric surface is a three-dimensional surface that varies in the three Cartesian coordinates in an algebraically defined manner that is related to conic sections. Euclidian planes as well as the surfaces of ellipsoids, spheres, paraboloids, and cones are examples of quadric surfaces. The Euclidian plane is technically considered a degenerate form of a quadric surface but, unless specifically stated otherwise within this disclosure, is explicitly included in this definition. Quadric surfaces are described by the general algebraic form: $Ax^2+By^2+Cz^2+Dxy+Exz+Fyz+Gx+Hy+Iz+J=0$.

Ring: As used in this disclosure, a ring is term that is used to describe a flat or plate-like structure through which an aperture is formed. Rings are often considered loops.

Screw: As used in this disclosure, to screw is a verb meaning: 1) to fasten or unfasten (unscrew) a threaded connection; or 2) to attach a helical structure to a solid structure.

Stanchion: As used in this disclosure, a stanchion refers to a vertical pole, post, or support. See beam and gusset and strut.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Tractor: As used in this disclosure, a tractor is a vehicle having a cab, no body and a powerful diesel or gasoline powered engine that is used to pull one or more trailers.

Trailer: As used in this disclosure, a trailer is an unpowered wheeled vehicle that is towed by a powered vehicle such as a tractor.

Truncated: As used in this disclosure, a geometric object is truncated when an apex, vertex, or end is cut off by a line or plane.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Universal Joint: As used in this disclosure, a universal joint is a method of joining the first shaft to a second shaft such that the center axis of the first shaft and is offset from the center axis of the second shaft. When a universal joint is formed with a locking mechanism, a universal joint can further be used to lock the angle between the first shaft and the second shaft into a fixed position. Universal joints are often used to transfer rotation from the first shaft to rotate the second shaft.

Vehicle: As used in this disclosure, a vehicle is a device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vessel: As used in this disclosure, a vessel is a type of vehicle. A vessel transports passengers, goods, or equipment over water.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety leg comprising:
a dock head, a stanchion, and a pedestal;
wherein the dock head attaches to the stanchion;
wherein the pedestal attaches to the stanchion;
wherein the safety leg is configured for use with a loading dock;
wherein the loading dock is further defined with a dock plate;
wherein the safety leg is configured for use with a trailer;
wherein the safety leg is a prop;
wherein the safety leg props the dock plate when the dock plate is bridging a gap between the loading dock and the trailer;
wherein the dock head mechanically supports an inferior side of the dock plate by forming a load path between the dock plate and the stanchion;
wherein the pedestal is an inferior component of the safety leg;
wherein the pedestal is formed in a shape of a right quadric section;
wherein the pedestal sits on a supporting surface such that a major axis of the pedestal projects perpendicularly away from the supporting surface:
wherein the pedestal further comprises an inferior flange;
wherein the pedestal is further defined with an apex;
wherein the apex is a point where the major axis of the right quadric section that forms the pedestal intersects with an exterior surface of the pedestal;
wherein the inferior flange attaches to the apex of the pedestal.

2. The safety leg according to claim 1
wherein the stanchion forms a load path between the dock head and the pedestal.

3. The safety leg according to claim 2
wherein the safety leg is a vertically adjustable jack structure;
wherein a cant is positioned between the dock head and the stanchion is adjustable.

4. The safety leg according to claim 3
wherein the dock head is a superior component of the safety leg;
wherein the stanchion is a hollow prism-shaped tubular structure;
wherein the stanchion forms a load bearing vertical structure;
wherein the stanchion is further defined with a superior end and an inferior end.

5. The safety leg according to claim 4
wherein the dock head comprises a prop plate, a universal joint, and a bolt;
wherein the prop plate attaches to the universal joint;
wherein the bolt attaches to the universal joint;
wherein the prop plate is further defined with an elevation;
wherein the elevation is a span of a vertical distance between a center of the prop plate and the support surface;
wherein the cant is an acute angle formed between a center axis of the stanchion and a hypothetical line drawn through the center of the prop plate that is perpendicular to faces of the prop plate.

6. The safety leg according to claim 5
wherein the prop plate is a metal plate structure;

wherein the prop plate attaches to the universal joint such that the prop plate forms a superior component of the dock head;

wherein the prop plate physically contacts the dock plate such that the prop plate transfers the load from the dock plate to the universal joint.

7. The safety leg according to claim 6
wherein the universal joint is a locking structure;
wherein the universal joint adjusts and fixes the cant relative to the dock head.

8. The safety leg according to claim 7
wherein the bolt is a cylindrical structure;
wherein the bolt is formed with an exterior screw thread;
wherein the bolt screws into the stanchion to attach the dock head to the stanchion;
wherein the bolt screws into the stanchion to form a threaded connection.

9. The safety leg according to claim 8
wherein the stanchion further comprises a head nut;
wherein the head nut is a disk-shaped ring that is further formed with an interior screw thread.

10. The safety leg according to claim 9
wherein the head nut is sized to receive the bolt to form the threaded connection that attaches the dock head to the stanchion;
wherein the head nut mounts on the superior end of the stanchion such that the center axis of the head nut aligns with the center axis of the stanchion.

11. The safety leg according to claim 10 wherein the head nut encloses an open end of the stanchion such that the bolt will move into the interior of the stanchion when the bolt screws into the head nut.

12. The safety leg according to claim 11 wherein a bifurcating plane of the pedestal sits on the supporting surface.

13. The safety leg according to claim 12
wherein the inferior flange is a flange;
wherein the inferior flange attaches the inferior end of the stanchion to the pedestal.

14. The safety leg according to claim 13
wherein the inferior flange is geometrically similar to the stanchion;
wherein an inner diameter of the inferior flange greater than an outer diameter of the stanchion;
wherein the inferior end of the stanchion inserts into the inferior flange.

15. The safety leg according to claim 14 wherein the inferior flange attaches to the apex of the pedestal such that the center axis of the inferior flange aligns with the major axis of the pedestal.

16. The safety leg according to claim 15
wherein the bolt screws into the head nut such that the center axis of the bolt and the center axis of the head nut align;
wherein the elevation of the prop plate adjusts by adjusting a depth that the bolt screws into the stanchion.

\* \* \* \* \*